United States Patent
Alexander (10) Patent No.: US 7,452,159 B2
(45) Date of Patent: Nov. 18, 2008

(54) METHOD OF MAKING A MULTI-LAYERED STRUCTURE FOR TREE WELL SKIRT AND SIDEWALKS

(75) Inventor: Karoleen B. Alexander, 22445 Overlake, Lake Forest, CA (US) 92630

(73) Assignee: Karoleen B. Alexander, Irvine, CA (US)

( * ) Notice: Subject to any disclaimer, the term of this patent is extended or adjusted under 35 U.S.C. 154(b) by 0 days.

(21) Appl. No.: 11/523,126

(22) Filed: Sep. 19, 2006

(65) Prior Publication Data

US 2007/0009665 A1    Jan. 11, 2007

Related U.S. Application Data

(62) Division of application No. 10/757,116, filed on Jan. 14, 2004.

(51) Int. Cl.
    *E01C 5/18* (2006.01)
(52) U.S. Cl. .................. 404/32; 404/82; 52/745.06
(58) Field of Classification Search ............. 52/745.05, 52/745.06, 745.07, 745.08; 404/17, 32, 33, 404/82
    See application file for complete search history.

(56) References Cited

U.S. PATENT DOCUMENTS

| | | | | |
|---|---|---|---|---|
| 1,554,865 A | | 9/1925 | Magoon .................. 47/48.5 |
| 3,571,972 A | | 3/1971 | Carter, Jr. .................. 47/32.4 |
| 3,673,134 A | | 6/1972 | Anderson .................. 523/132 |
| 3,891,585 A | * | 6/1975 | McDonald .................. 523/307 |
| 3,894,686 A | * | 7/1975 | Weinberg et al. .................. 238/8 |
| 3,930,100 A | * | 12/1975 | McDonald .................. 428/323 |
| 4,082,888 A | * | 4/1978 | Portin .................. 428/327 |
| 4,205,102 A | | 5/1980 | Akzo N.V. et al. ....... 427/393.5 |
| 4,396,312 A | * | 8/1983 | Nilsson .................. 404/72 |
| 4,648,203 A | | 3/1987 | Worzek |
| 4,882,386 A | | 11/1989 | Stella .................. 525/133 |
| 4,928,443 A | | 5/1990 | Goodman et al. .......... 52/58 |
| 5,058,317 A | | 10/1991 | McMurtrey .................. 47/31.1 |
| 5,065,543 A | | 11/1991 | Brook .................. 47/30 |
| 5,085,001 A | | 2/1992 | Crawley .................. 47/9 |
| 5,182,137 A | * | 1/1993 | Allen .................. 427/138 |
| 5,199,815 A | * | 4/1993 | Inoue et al. .................. 404/18 |
| 5,204,159 A | * | 4/1993 | Tan .................. 428/143 |
| 5,212,904 A | | 5/1993 | Green et al. ............. 47/48.5 |
| 5,323,557 A | | 6/1994 | Sonntag |
| 5,396,731 A | | 3/1995 | Byrne .................. 47/32 |
| 5,468,539 A | * | 11/1995 | Crivelli .................. 428/141 |
| 5,502,921 A | | 4/1996 | Hyslop .................. 47/32 |
| 5,511,899 A | * | 4/1996 | Pavelek, II .................. 404/31 |

(Continued)

FOREIGN PATENT DOCUMENTS

DE     4108994     9/1991

(Continued)

*Primary Examiner*—David J Parsley (57) ABSTRACT

A flexible, porous and durable tree well skirt and a sidewalk structure are made of a cushion base of butadiene rubber and a wear layer of ethylene propylene diene monomer (EPDM). The butadiene rubber is mixed with an isocyanate polyurethane binder and spread on the ground around the tree to form the cushion base of the tree well skirt. The EPDM is mixed with an isocyanate polyurethane binder and spread over the cushion base to form the wear layer. The cushion base and wear layer structure used for a sidewalk is spread over a stabilized porous base.

7 Claims, 5 Drawing Sheets

U.S. PATENT DOCUMENTS

| | | |
|---|---|---|
| 5,522,176 A | 6/1996 | Suttle |
| 5,525,416 A * | 6/1996 | Katz et al. .................. 428/193 |
| 5,605,721 A * | 2/1997 | Di Geronimo ............. 427/373 |
| 5,678,353 A | 10/1997 | Tsao et al. ..................... 47/32 |
| 5,730,773 A | 3/1998 | Farley ....................... 71/64.11 |
| 6,071,039 A * | 6/2000 | Ogura et al. .................. 404/32 |
| 6,319,545 B1 | 11/2001 | Laurent |
| 6,360,480 B1 | 3/2002 | Christensen ........... 47/58.1 LS |
| 6,602,586 B2 * | 8/2003 | Kakimoto et al. ........... 428/213 |
| 6,705,044 B2 | 3/2004 | Clancey ......................... 47/32 |
| 6,786,674 B1 * | 9/2004 | Hanks ......................... 404/32 |
| 6,818,278 B1 | 11/2004 | Blythe |
| 2003/0091831 A1 * | 5/2003 | Mickey ................... 428/423.1 |

FOREIGN PATENT DOCUMENTS

| | | |
|---|---|---|
| EP | 0135595 | 4/1985 |
| EP | 0631016 | * 12/1994 |

* cited by examiner

METHOD OF MAKING A MULTI-LAYERED STRUCTURE FOR TREE WELL SKIRT AND SIDEWALKS

CROSS-REFERENCES TO RELATED APPLICATIONS

This application is a divisional of application Ser. No. 10/757,116 filed Jan. 14, 2004 for A Multi-Layered structure for Tree Well Skirts and Sidewalks and Method of Making Same.

BACKGROUND OF THE INVENTION

1. Field of the Invention

The present invention relates generally to improvements in tree well skirts and sidewalks, and more particularly, pertains to new and improved tree well skirts and sidewalks that allow water and nutrients to penetrate into the substrate, encouraging deep rooting while also providing a flexible, attractive durable surface that is capable of accommodating a degree of root movement close to the surface without cracking or breaking.

2. Description of Related Art

It has long been known in the prior art that trees and shrubs in an urban environment frequently suffer from a lack of available moisture and nutrients due to the presence of sidewalks and pathways, patios, or other paved areas in the immediate vicinity of the trees. As a result of moisture and nutrient starvation, the tree or shrub directs its root growth towards the surface in search of moisture and nutrients. The roots are particularly attracted to the underside of concrete or other impervious materials commonly used for sidewalks, pathways or patios because of the condensation which typically forms there. The result is damage to and breakage of these hard surfaces. The damage caused by the roots coming to the surface ranges from cosmetic or superficial cracking and distortion to dangerous structural breakage. The commonly accepted method in the prior art of reducing this problem has been to provide a small area immediately adjacent to the tree which is not covered by concrete, asphalt, tile, or other impervious material. This area, which is commonly referred to as the tree well, is treated in several different ways. Typical methods include compacting of the earth around the trunk and filling with sand, gravel, wood chips or other porous loose material, installing a metal grate over loose porous material, or planting grass or other ground cover in the tree well. The problem with these techniques is that loose materials require frequent replenishment and maintenance due to erosion, or dispersion caused by weather conditions or human and animal interaction. Moreover, these all require weed control. Metal grates are expensive and are subject to displacement by subsistence, root heave or human interference and also require frequent cleaning to remove garbage and litter.

Thus, the prior art has not addressed the problem of root heave by use of tree wells since the tree well skirts devised by the prior art still have the problems. Moreover, the use of tree wells has not stopped root heave from occurring in sidewalks, patios and other paved areas. The only prior art solution offered has been to cut the roots back and patch the damaged area as required.

SUMMARY OF THE INVENTION

A structure having a base layer and wear layer is poured in place to make a flexible, porous and desirable tree well skirt or a sidewalk that will allow water and nutrients to penetrate into the substrate and encourage deep rooting of the surrounding trees while also accommodating a degree of tree movement and growth close to the surface without cracking or breaking. The base layer is a mixture of butadiene rubber in the form of granulate, peelings or buffings that can be obtained from recycled tires or industrial rubber, and a binder of isocyanate polyurethane. The rubber granules are typically in the range of 1.5 mm to 6 mm in diameter. A mixture of 70% granules and 30% peelings or buffings is preferred for sidewalk applications. A mixture of 50% granules and 50% peelings or buffings is preferred for tree well skirt applications. A thickness of about two inches is preferred for the base layer. The binder of isocyanate polyurethane is mixed with the rubber material in a preferred ratio of 16% binder to rubber by weight to produce the base layer. The wear layer is a mixture of ethylene propylene diene monomer (EPDM) and a binder of isocyanate polyurethane. The wear layer is made of granulated material that is mixed with the binder at a ratio of 20% by weight binder to EPDM granules. The wear layer is poured over the base layer to a preferred thickness of three-eighths to one-half inch.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
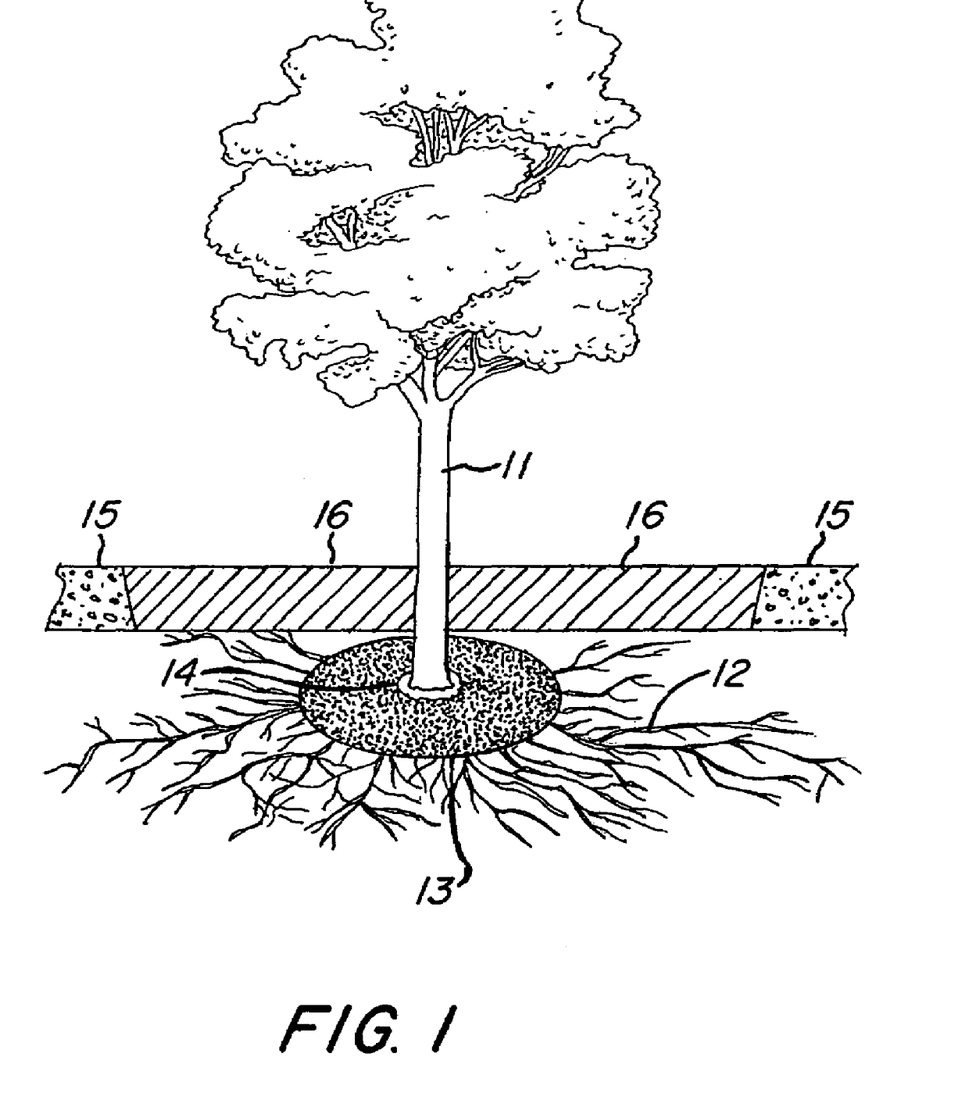
FIG. 1 is a diagrammatic illustration of a tree with a tree well skirt at its base according to the present invention.

FIG. 1 is a perspective illustration of a tree 11 having a tree well skirt 13, shown in a circular configuration, with a portion of a sidewalk installation 16 installed adjacent to tree 11 as a repair to a damaged concrete or asphalt sidewalk 15.

The tree well skirt 13 is custom fit because it is poured in place around the trunk of the tree 11, at its base, so that the top surface of the tree well skirt 13 is flush with the surrounding earth and covers the entire tree well area, as desired. A narrow space 14 of approximately one inch is left between the inside perimeter of the tree well skirt and the trunk to allow air to circulate around the trunk base, thereby reducing possible damage to the bark of the tree 11 as a result of rot or insect infestation. Because of the materials used for the tree well, as the tree grows, the tree well skirt 13 may have its inside perimeter cut away with a sharp knife, to allow the gap between the inside perimeter of the tree well skirt and the trunk to be maintained at approximately one inch. The tree well skirt 13 inhibits the growth of weeds, grass or other foliage beneath its surface while at the same time allowing water to penetrate through it to the root system 12 of the tree 11. This characteristic of the tree well skirt 13 of the present invention, to allow the passage of water into the ground through its surface, encourages the tree roots to grow down instead of up. This prevents or at least inhibits root heave caused by root systems that grow towards the surface of the earth in search of moisture.

The installation and use of the tree well skirt 13 of the present invention serves as a preventative measure to reduce the probability of root heave damage to surrounding structures while at the same time allowing the introduction of liquid nutrients or systemic pesticides into the tree root environment, through its surface.

FIG. 1 also illustrates the repair of a sidewalk 15 running close to the tree 11. Sidewalk 15 is assumed to be a concrete or asphalt sidewalk with a section 16 having been damaged by root heave. This section is shown as replaced by a sidewalk according to the present invention. FIG. 1 illustrates how the invention can be used to repair sidewalks that have been damaged by root heave in the vicinity of a tree 11. A damaged sidewalk is repaired by removing the broken parts of sidewalk 15, cutting back the exposed roots or the roots close to the surface, and pouring the sidewalk to be flush with the surfaces 15 of the concrete or asphalt portion. The manner in which the sidewalk of the present invention is poured will be described hereinafter.

Figure 2:
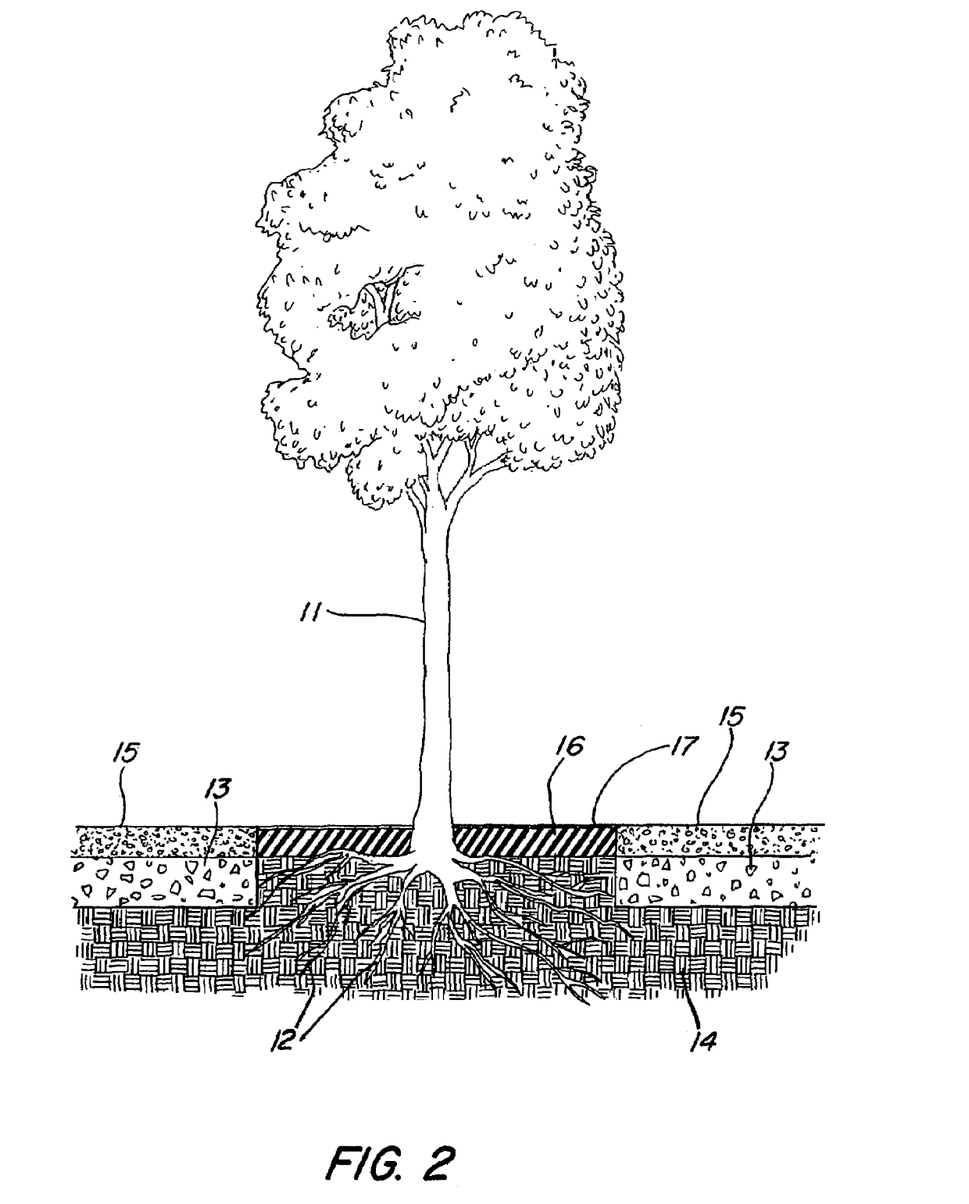
FIG. 2 is a diagrammatic and cross-sectional illustration of a tree well skirt installed around the tree.

A more detailed presentation of the installation of a tree well skirt around tree 11 is shown in FIG. 2. Tree 11 is shown placed in an opening in an existing sidewalk, patio or other hard surface structure 12 which is typically laid on a compacted aggregate, gravel, decomposed granite or other similar composite sub-base 13. The opening for the tree 11 may be any size or shape and should be clear of any materials down to the level of the bare earth 14. Earth may be added or removed from the opening and moderately compacted at a level approximately two and one-half inches to three inches below the surface of the surrounding hard surface 13. This depth should be equal to the depth of the cushion layer 16 and the wear layer 17 to be used for the installation. How this required depth is determined will be discussed below.

The tree roots 12 that are near the surface and exposed to the point where they go above the surface of hardscape 15 should be pruned or removed.

To facilitate the space between the tree trunk and the inner surface of the tree well skirt, a disposable barrier of bubble plastic, foam or other suitable material is placed around the trunk to a thickness of approximately one inch. This barrier is readily removed once the installation of the tree well skirt has been completed, and the material of the tree well skirt is cured to the point that it will not sag or flow into this open space.

A base layer 16 which is essentially a cushion base, made of butadiene rubber mixed with an isocyanate polyurethane binder, is first poured into the tree well and spread evenly with a light trowel pressure to a depth of approximately one-half inch below the surface of the surrounding hardscape 15. The base layer composition is allowed to cure until almost firm. The cure rate of the base layer is affected by the temperature and the humidity of the surrounding atmosphere. The higher the temperature and humidity, the faster the cure rate. The lower the temperature and humidity, the slower the cure rate.

Various different chemical compositions of isocyanate polyurethane binder may be used, depending upon the weather conditions. A summer grade of isocyanate polyurethane is used for warmer temperature and higher humidity. A winter grade may be used for colder temperatures and lower humidity.

The butadiene rubber utilized for the base layer 16 may, within limits, be varied to provide differing degrees of flexibility, resilience and porosity. It is preferred that butadiene rubber from recycled vehicle tires is used, although virgin rubber of appropriate mesh size may also be used. Recycled industrial rubber may be used as well. These rubber materials are commonly available in granular form or in the form of peelings or buffings. It is preferred that a mixture of granular and peelings or buffings be utilized. Increasing the volume of peelings or buffings of butadiene rubber in the mixture with respect to the granular form will increase the porosity and flexibility of the base layer, while decreasing its firmness. Increasing the amount of granular form butadiene rubber will reduce the porosity and flexibility and increase the firmness of the base layer. Consideration of these factors and the preferred ratios is discussed hereinafter.

The base layer 16 is allowed to partially cure to an acceptable degree of set, that is, to a point wherein the base material will not stick to a hand or trowel placed on the surface. At that point, a wear layer 17 is poured onto the base layer. The wear layer is a mixture of ethylene propylene diene monomer mixed with an isocyanate polyurethane binder. This material is placed over the partially cured base layer 16 and trowelled with a light trowel pressure to be flush with the surface of the surrounding sidewalk or hardscape 15.

The wear layer 17 of ethylene propylene diene monomer (EPDM) may be mixed or blended in various colors to provide a visible surface that is appropriate for the tree well skirt in that area. A variety of patterns may be created by damming sections of the wear layer, allowing those sections to partially cure, removing the dam, then filling the dammed areas with a different color of EPDM wear surface material, thereby creating patterns or markings that are permanently installed in the tree well skirt.

If a metal grate is required, such as might be required in a public park, or a street environment, for example, the base layer 16 is applied in the tree well skirt area to a depth below the surface of the surrounding hardscape or sidewalk 15 to the thickness of a grate (not shown) to be installed. Once the base layer 16 is installed and cured to an adequate degree of firmness, the grate is placed in the tree well on top of the base layer 16. The wear layer of EPDM is then trowelled with light pressure into the apertures of the grate. The excess material is scraped and wiped off the grate surface. The grate is held firmly within the base layer and by the wear layer material 17 after it is cured.

Figure 3:
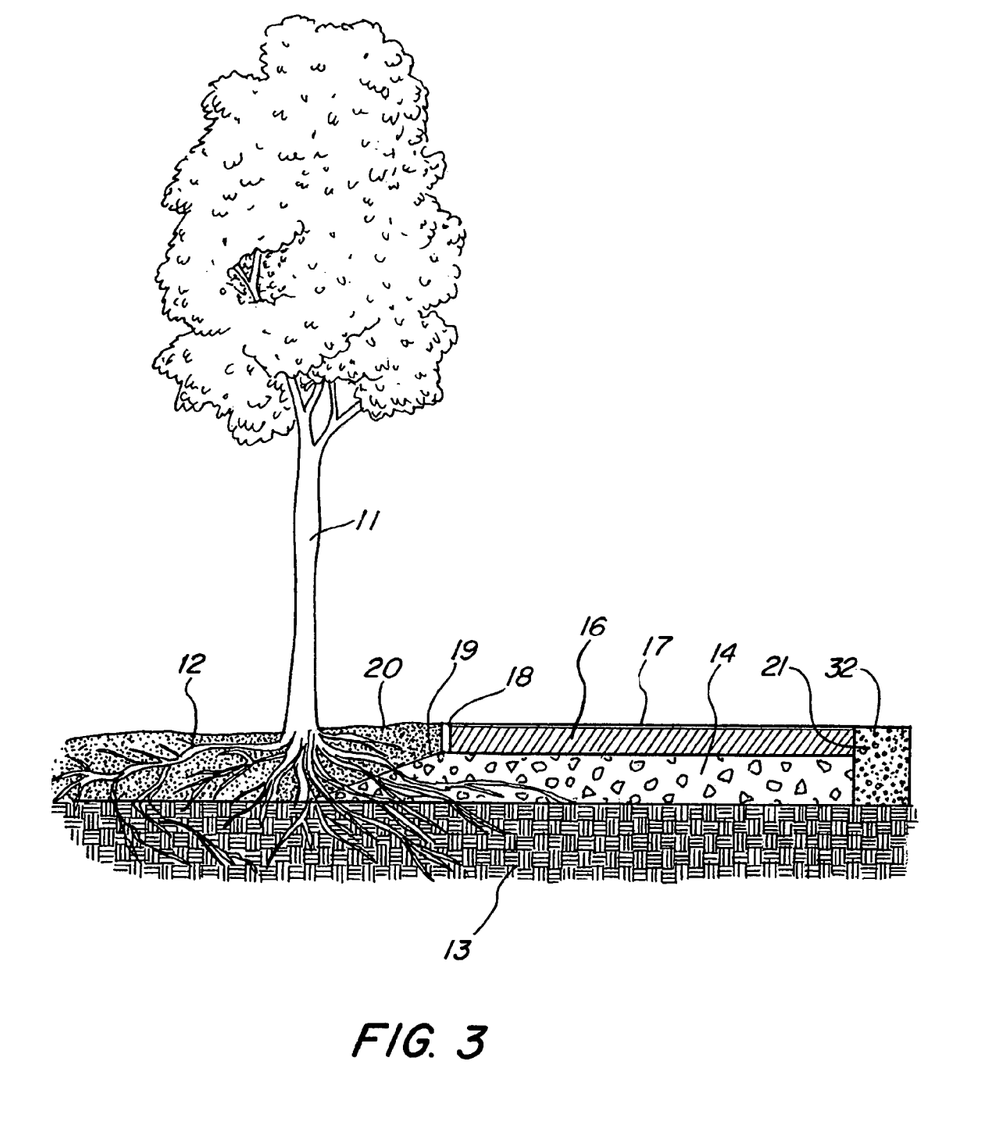
FIG. 3 is a diagrammatic and cross-section illustration of a typical sidewalk installation according to the present invention.

Referring now to FIG. 3, a cross-sectional view of the invention used as a sidewalk, pathway, patio or other hard surface is illustrated. The tree 11 is shown positioned adjacent to the sidewalk or similar hard surface. If an existing hard surface has been damaged or disturbed by root heave, that damaged section, regardless of size or shape, must be removed down to the earth level 13. Any protruding roots 12, that may cause a hazard must be pruned and removed.

A bender board for curved paths or a straight backing board 18 is placed to form an edge of the sidewalk. It is used only during installation to provide a firm edge for the installation. The board 18 must be as wide as the depth of the installation so that it can act as a depth gauge for the pouring and trowelling of the slurry material according to the present invention. Besides a temporary backing such as bender board 18, a permanent hard edge 32 made out of concrete or other durable material may be utilized. This hard edge 32 may be like a curb which borders the sidewalk. This permanent curb, typically made of concrete or some other durable material, may be poured or otherwise installed to the height of the sidewalk, path or patio, and allowed to cure. A hard curb, such as curb 32, may be used on both sides, or a mixture of a hard curb 32 and a soft curb made out of grass, wood chips, sand or other impermanent material 19 may be utilized after the bender board 18 is removed.

When a hard curb 32 is utilized, it is preferred that a section of steel wire or mesh or metal dowels 21 be embedded in the concrete or asphalt curb 32 to extend at least three inches into the base layer 16. It is preferred that a number 2 mesh, 16-gauge welded wire mesh is utilized. This mesh is available in 4-foot rolls. Use of 9-inch by 4-foot strips placed four feet apart within the curb 15 would be sufficient support for most installations. Use of galvanized steel wire is preferred, since galvanized lasts longer than untreated wire.

The wire mesh is installed at a height that is about an inch below the existing surface of curb 15 to insure that the wire mesh 21 extends into the base layer 16 and is below the wear layer 17. Metal dowels may also be used in place of the wire mesh. Holes are drilled into the existing concrete curb. Metal dowels are placed into the drilled holes so that the dowels extend into the base layer 16, thereby providing stability to the rubber sidewalk replacement.

Before the base layer 16 is poured, a leveling course 14 of crushed rock, or decomposed granite or similar porous material composite should be installed within the range of two and one-half inches to three inches below the surface of curb 15. The actual distance between the top of the leveling course 14 and the existing surface is equal to the depth of the base layer 16 plus the wear layer 17 to be installed. This step is determined within certain parameters by the installer to suit the requirements of the installation. The specific and preferred criteria for determining these variables is discussed hereinafter.

For the soft edge side 19 where a bender board 18 is used, the leveling course 14 is beveled at approximately 30 degrees. It is preferred that the leveling course 14 be at least five inches thick or greater and compacted 95% to provide a firm, secure, but still porous, foundation.

After the leveling layer 14 is laid down, the base layer 16 of butadiene rubber mixed with isocyanate polyurethane binder is poured on top of the leveling layer 14 and spread evenly with a light trowel pressure so that it is at about one-half inch below the top surface of the surrounding curb 32. The base layer composition is allowed to cure to an acceptable degree of set, wherein the material will not stick to a hand or trowel once placed on the surface. The wear layer 17 may then be applied. The wear layer 17 is a mixture of EPDM with an isocyanate polyurethane binder. It is poured on top of the base layer and trowelled with a light trowel pressure to a height which is flush with the top surface of the surrounding borders 32 and 18. The wear layer 17 is allowed to cure until it is set to a point where the backing board 18 may be removed and the base layer 16 and wear layer 17 do not slump or sag. The soft edge of the installation is then back filled with material 19 at approximately 45 degrees with the wear layer mix as shown in FIG. 3. Any excess of materials from the base layer at the lower part of this soft edge may be used. Thereafter, the entire soft edge area is filled with the appropriate material to the level of the installation.

The resulting installation of this sidewalk, according to the present invention, provides a firm, yet resilient surface that allows water, nutrients and systemic pesticides, for example, to pass through to the root system. This encourages deep rooting and inhibits or prevents root heave entirely. Beyond that, the installation is flexible enough to accommodate some root movement and growth without damage or breakage of the rubber base layer and wear layer. The installation will allow considerable protuberance before cracking or breaking, thereby offering a safer and more durable solution than simply patching concrete or asphalt sidewalks as cracks appear.

Figure 4:
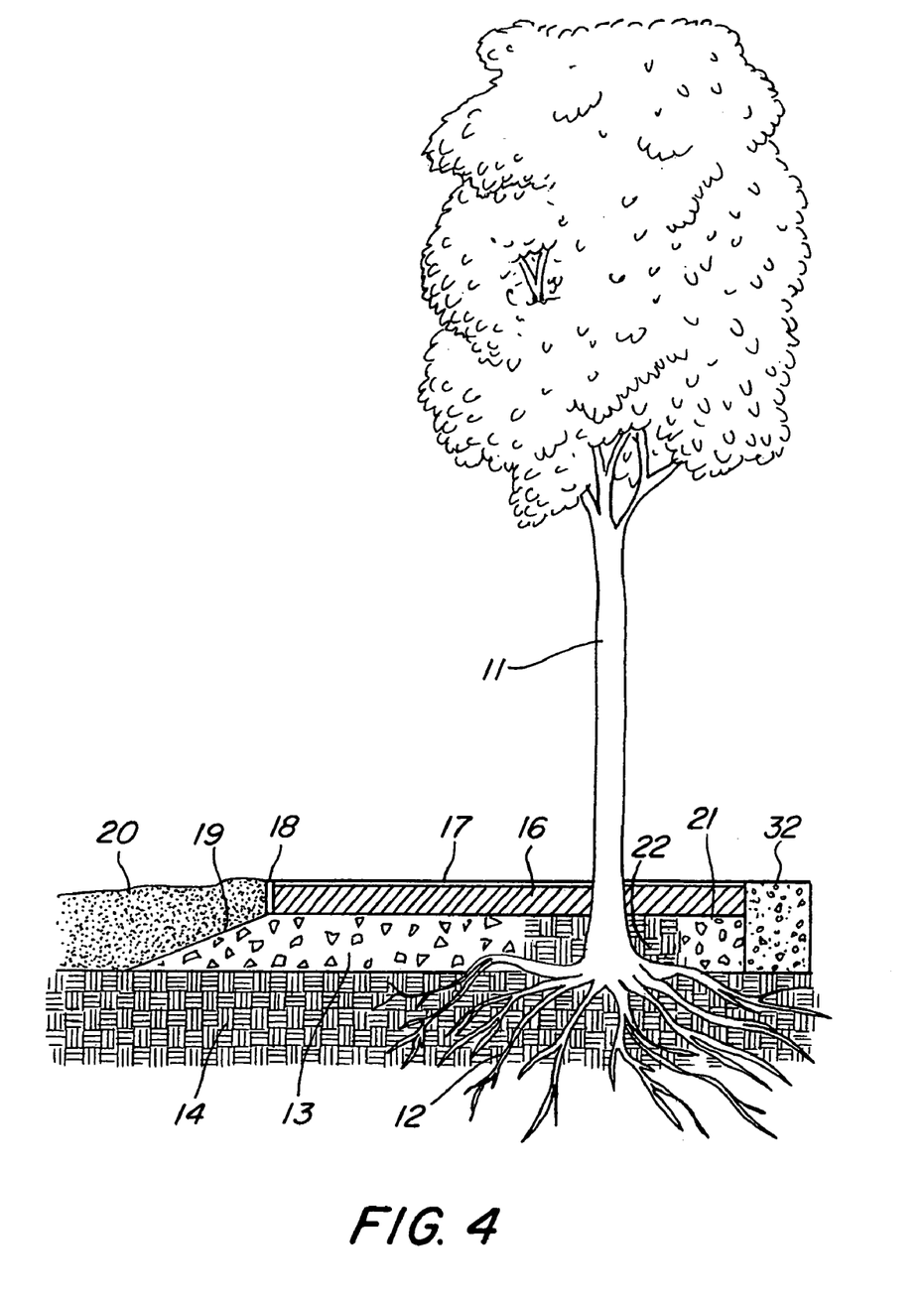
FIG. 4 is a diagrammatic and cross-sectional illustration of an alternate sidewalk installation having a tree growing through the sidewalk.

In those exceedingly difficult situations that may occur in public parks or public sidewalks, for example, wherein a tree is growing through or is surrounded by a sidewalk or pathway, the present invention has particular utility and essentially a permanent cure to the root heave problem. FIG. 4 illustrates a sectional view of the invention used in such an installation.

The installation of FIG. 4 is the same as for the installation shown in FIG. 3 where the tree is adjacent to the hardscape, sidewalk or patio, except it is growing through a sidewalk or patio. In the installation of FIG. 4, an area of dirt and roots adjacent to the tree is completely removed and replaced by moderately compacted earth 22. This provides a more natural cushion to the tree trunk and the root system and also provides a pathway for natural nutrients and minerals that is not present in crushed stone, gravel or conglomerate-leveling composite materials. The earth 22 cover must be compacted sufficiently to prevent subsistence when the sidewalk structure of the present invention is installed on top of it.

Figure 5:
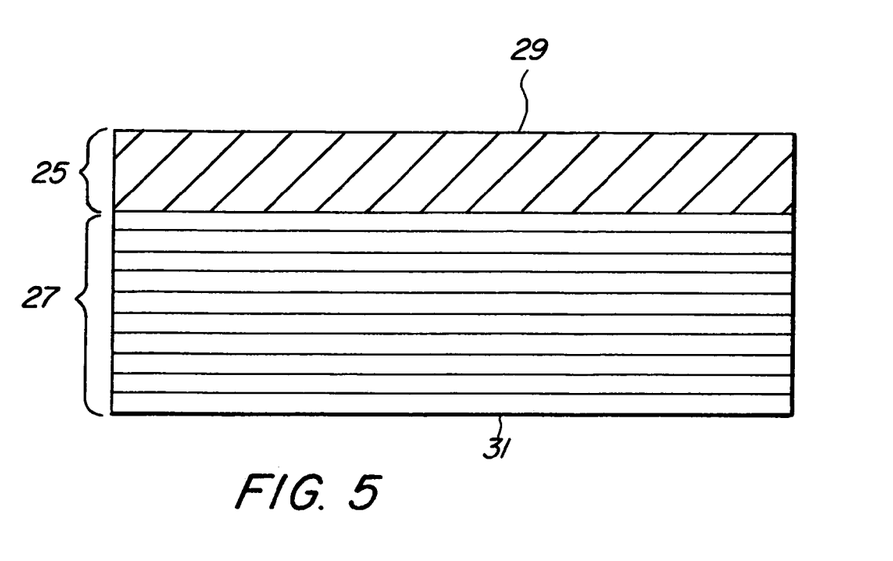
FIG. 5 is a cross-section illustration of a tree well skirt according to the present invention.

The basic structure of a tree well skirt is shown in cross-section in FIG. 5. The base layer 31 for a tree well skirt is mixture of butadiene rubber, which is preferably obtained from recycled vehicle tires or industrial rubber, in the form of granulate or peelings or buffings, and a binder such as isocyanate polyurethane. The granulate is preferably from 1.5 mm to 6 mm in diameter.

Mixing only rubber granules and the binder produces a dense, firm installation with reduced porosity and very little flexibility, but much greater deflection and distortion resistance. Thus, using only granular butadiene rubber materials makes a base layer that is more suited for use with heavy vehicles such as at the entrance to driveways or parking lots, for example. Using an all-granular and relatively thin base layer 35, i.e., one inch to two inches, tends to produce a surface with considerably less rolling resistance, which may be desirable in areas where there is frequent use of wheelchairs, perambulators, skateboards or roller skates, for example.

When butadiene rubber peelings and buffings are mixed with a binder, these particles produce a softer, more porous base layer 31 with greater shock absorbency, but considerably less distortion and deflection resistance. This type of mixture is suitable where only pedestrian traffic is likely to be encountered and fall safety and high porosity are desirable. In practice, a mixture of granulates and peelings or buffings provides the best all-round application. For tree well skirts, for example, it has been found that a blend of 50% granules and 50% peelings or buffings provides the most suitable mixture. For sidewalks or patio surfaces, for example, it has been found through experience that a blend of 70% granules with 30% peelings or buffings provides the best mixture. For those areas of sidewalks that pass driveway entrances or other areas where vehicle traffic will be encountered, a 100% granular mixture may be more desirable.

The thickness of the base layer 31 also determines the shock absorbency, porosity and deformation characteristics of the installation. The thicker the base layer 31, the more the shock absorbency and deformation and the less the porosity. Porosity is decreased with thickness due to the fact that the liquids must pass through a greater depth of material, and not necessarily because the material is denser. Through experimentation, it has been determined that a base layer 31 having an average thickness of two inches is most desirable for sidewalks and patios, for example, with a range of two to three inches of thickness being satisfactory. For tree well skirts, on the other hand, a thicker base layer 31 may be utilized. For the tree well skirt, a base layer 31 in the range of one and one-half to three and one-half inches was satisfactory.

It has been found through considerable experimentation that a blend of 70% granular rubber with 30% peelings or buffings provides the best base layer 31 mixture for sidewalks or patios and the like.

The typical binder material used to bond the rubber mixture together in the binder layer 31 is isocyanate polyurethane compound. This one-part material cures by exposure to air. High temperatures and high humidity produce a shorter cure time. Manufacturers of this compound produce a summer and winter mixture. The winter grade produces the fastest cure times. It has been found useful to use the winter grade, even in warmer temperatures, to produce a fast cure when the installation is in an area subject to possible damage to the uncured material if it sits uncured for too long.

The isocyanate polyurethane is mixed with the butadiene rubber compound composition in a ratio of 16% binder to rubber compound by weight. It has been found through considerable experimentation that this is the optimum ratio of binder to rubber composition for the base layer 31.

The wear layer 29 is made of ethylene propylene diene monomer (EPDM) typically installed at a thickness of three-eighths to one-half inch on top of the base layer 31. EPDM is preferably in granular form with the granules ranging from 1.5 mm to 6 mm in diameter. The EPDM may be mixed with the same isocyanate polyurethane binder as used in the base layer and is subject to the same above-mentioned considerations. However, for the wear layer, the ratio of binder to EPDM is 20% by weight.

When color is a consideration for the wear layer, an aliphatic binder which contains aliphatic diisocyanate may be used. Although this type of binder product is more costly, it is clear rather than amber in color. It is used in those situations where a slight discoloration of the surface may not be acceptable.

Even though the wear layer 29 is composed of all granulated material, thereby producing a much denser and more hard wearing surface, the fact that it is only three-eighths to one-half inch thick does not appreciably affect the porosity.

Figure 6:
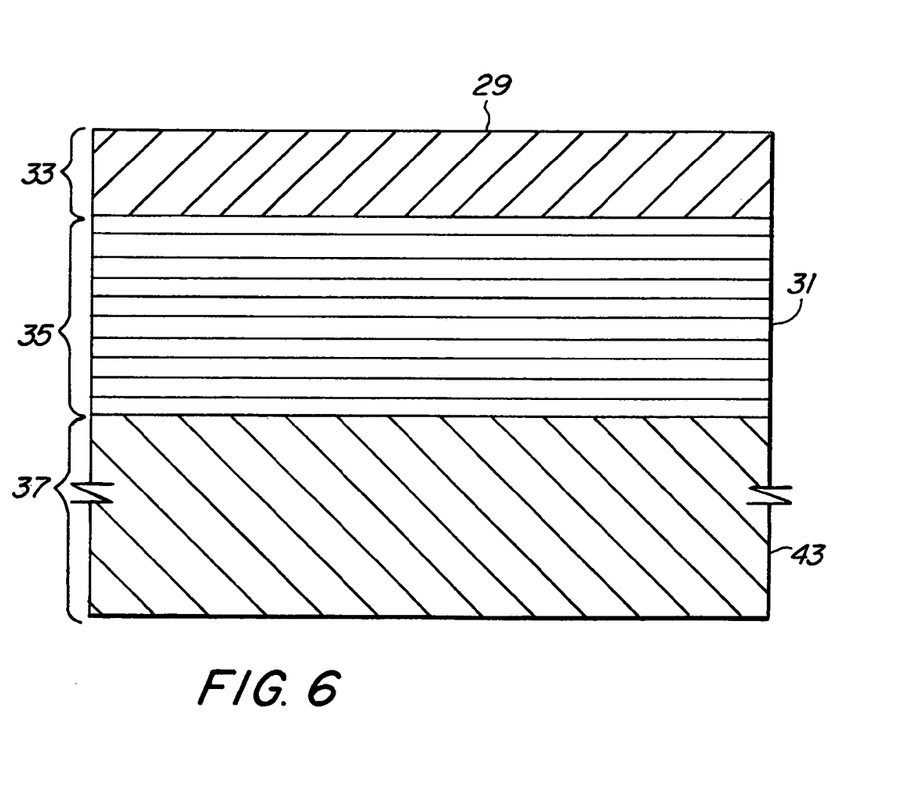
FIG. 6 is a cross-section illustration of a sidewalk according to the present invention.

FIG. 6 illustrates installation of the present invention as a sidewalk or patio surface, for example. Besides the base layer 31 and wear layer 29, a leveling layer 43 made up of a compacted porous composition such as crushed stone, or other like porous material is utilized for a height or thickness 37 as required. For sidewalk and hard surface use, it is preferred that the thickness 35 of the base layer 31 be two inches, while the thickness 33 of wear layer 27 be three-eighths of an inch. The thickness 33, and 35 of the layers 27 and 31 for the sidewalk installation is less than the thickness 27 of the base layer 31 and the thickness 25 of the wear layer 29 for the tree well skirt installation (FIG. 5) because of the much greater traffic use that is seen by the sidewalk structure of FIG. 6.

The tree well skirt and sidewalk structure of the present invention is installed much the same way that a concrete sidewalk is installed. No special tools or machinery is required. The base layer mixture and the wear layer mixture are prepared on-site. The materials may be mixed in a readily available commercial mixer or, in the case of small quantities, by hand, in a wheelbarrow to a consistent slurry. The slurry is then poured in place and raked and trowelled to a level surface. The wear layer has a final trowelling by hand in the same manner that a concrete sidewalk surface is hand trowelled to obtain a smooth surface.

What is claimed is:

1. A method of forming a sidewalk, the steps of the method comprising:
   preparing a form to outline the sidewalk;
   preparing a leveling layer of porous composite material in the form;
   mixing a combination of butadiene rubber granules and peelings or buffings and a binder of isocyanate polyurethane to form a pourable slurry;
   varying the proportion of butadiene rubber granules relative to the amount of peelings or buffings in the combination to increase or decrease the porosity of a base layer of the sidewalk;
   pouring the slurry of rubber and binder in place in the form over the leveling layer to form the base layer of the sidewalk;
   leveling the poured rubber and binder slurry;
   mixing ethylene propylene diene monomer (EPDM) and a binder of isocyanate polyurethane to form a pourable slurry;
   pouring the slurry of EPDM and binder in place over the base layer to form a wear layer of the sidewalk; and
   leveling the poured EPDM and binder slurry.

2. The method of claim 1 wherein the pouring a slurry of rubber and binder step includes pouring a base layer that is two inches to three inches thick.

3. The method of claim 2 wherein the pouring a slurry of EPDM and binder step includes pouring a wear layer that is three-eighths to one-half inch thick.

4. The method of claim 1 wherein the rubber in the base layer is a butadiene rubber recycled from vehicle tires or industrial rubber and the binder is isocyanate polyurethane.

5. The method of claim 1 wherein the butadiene rubber is a combination of granules and peelings or buffings at a ratio of 70% granules and 30% peelings or buffings.

6. The method of claim 5 wherein the granules are in the range of 1.5 mm to 6 mm in diameter, inclusive.

7. The method of claim 1 wherein the EPDM is granular, with the granules being in the range of 1.5 mm to 6 mm in diameter, inclusive.

* * * * *